United States Patent
Mitchell

(10) Patent No.: US 11,051,444 B2
(45) Date of Patent: Jul. 6, 2021

(54) SEED ACTIVATION SYSTEM AND METHOD

(71) Applicant: Miles Mitchell, Gower, MO (US)

(72) Inventor: Miles Mitchell, Gower, MO (US)

( * ) Notice: Subject to any disclaimer, the term of this patent is extended or adjusted under 35 U.S.C. 154(b) by 260 days.

(21) Appl. No.: 16/168,976

(22) Filed: Oct. 24, 2018

(65) Prior Publication Data

US 2019/0116720 A1 Apr. 25, 2019

Related U.S. Application Data

(60) Provisional application No. 62/576,410, filed on Oct. 24, 2017.

(51) Int. Cl.
| | |
|---|---|
| *A01C 1/06* | (2006.01) |
| *A01N 25/34* | (2006.01) |
| *B01J 19/12* | (2006.01) |
| *A01C 1/02* | (2006.01) |
| *A01C 14/00* | (2006.01) |

(52) U.S. Cl.
CPC .............. *A01C 1/06* (2013.01); *A01C 1/02* (2013.01); *A01C 14/00* (2013.01); *A01N 25/34* (2013.01); *B01J 19/12* (2013.01)

(58) Field of Classification Search
CPC .............. A01G 7/04; A01C 1/06; A01C 1/02
USPC .......................................................... 47/57.6
See application file for complete search history.

(56) References Cited

U.S. PATENT DOCUMENTS

| | | | | |
|---|---|---|---|---|
| 3,905,152 A | * | 9/1975 | Loperfido | A01C 1/06 47/57.6 |
| 4,543,370 A | * | 9/1985 | Porter | A23G 3/0205 106/146.4 |
| 5,918,413 A | * | 7/1999 | Otani | A01C 1/06 442/166 |
| 6,202,346 B1 | * | 3/2001 | Lyons | A01C 1/06 47/57.6 |
| 8,375,629 B2 | * | 2/2013 | Prasad | C05G 5/37 47/57.6 |
| 9,006,141 B2 | * | 4/2015 | Schwindt | A01N 25/34 504/116.1 |
| 9,078,393 B1 | * | 7/2015 | Polizotto | A01G 25/09 |
| 9,775,284 B2 | * | 10/2017 | Polizotto | A01C 21/00 |
| 2004/0121019 A1 | * | 6/2004 | Perrier | A61K 8/606 424/490 |

(Continued)

*Primary Examiner* — Magdalena Topolski
*Assistant Examiner* — Kevin M Dennis
(74) *Attorney, Agent, or Firm* — Erise IP, P.A.

(57) ABSTRACT

A seed activation system includes a shattering layer applied to an outer surface of a seed. The shattering layer forms a water-resistant coating around the seed that prevents the seed from germinating. An activation mechanism for transmitting electromagnetic energy is provided such that the shattering layer is compromised to break the water-resistant coating. The seed is then able to receive water and germinate. A seed activation method includes applying a shattering layer to an outer surface of a seed. The shattering layer forms a water-resistant coating around the seed that prevents the seed from germinating. The method further includes planting the seed in a soil, selecting an activation time, and activating the seed at the activation time by transmitting electromagnetic energy into the soil such that the shattering layer is compromised thereby breaking the water-resistant coating. The seed is then able to receive water for germinating.

14 Claims, 2 Drawing Sheets

(56) References Cited

U.S. PATENT DOCUMENTS

| | | | | |
|---|---|---|---|---|
| 2011/0259443 | A1* | 10/2011 | Preschutti | A01N 25/00 |
| | | | | 137/343 |
| 2014/0011013 | A1* | 1/2014 | Jin | H01L 31/02366 |
| | | | | 428/297.4 |
| 2014/0352210 | A1* | 12/2014 | Redding, Jr. | B06B 3/00 |
| | | | | 47/57.6 |
| 2015/0267063 | A1* | 9/2015 | Drewer | A01C 1/06 |
| | | | | 47/57.6 |
| 2015/0282423 | A1* | 10/2015 | Polizotto | A01C 21/005 |
| | | | | 239/1 |
| 2016/0029548 | A9* | 2/2016 | Redding, Jr. | B06B 3/00 |
| | | | | 47/57.6 |
| 2016/0151805 | A1* | 6/2016 | Scheffler | B05D 7/58 |
| | | | | 504/100 |
| 2017/0347519 | A1* | 12/2017 | Polizotto | A01C 23/04 |
| 2018/0160629 | A1* | 6/2018 | Redding, Jr. | A01G 7/00 |

\* cited by examiner

SEED ACTIVATION SYSTEM AND METHOD

RELATED APPLICATION

This application claims the benefit of U.S. Provisional Patent Application Ser. No. 62/576,410 entitled Seed Activation System and filed Oct. 24, 2017, the disclosure of which is herein incorporated by reference in its entirety.

BACKGROUND

1. Field

The invention relates generally to agriculture methods relating to crops. More specifically, the invention relates to the treatment of both genetically modified (GMO) seeds as well as non-genetically modified (non-GMO) seeds for the purpose of improving plant timing and yield.

2. Related Art

None.

SUMMARY

In an embodiment, a seed activation system is provided. The seed activation system includes a shattering layer applied to an outer surface of a seed. The shattering layer forms a water-resistant coating around the seed that prevents the seed from germinating. An activation mechanism for transmitting electromagnetic energy is provided such that the shattering layer is compromised thereby breaking the water-resistant coating such that the seed is able to receive water and germinate.

In another embodiment, a seed activation method includes applying a shattering layer to an outer surface of a seed. The shattering layer forms a water-resistant coating around the seed that prevents the seed from germinating. The method further includes planting the seed in a soil, selecting an activation time, and activating the seed at the activation time by transmitting electromagnetic energy into the soil such that the shattering layer is compromised thereby breaking the water-resistant coating such that the seed is capable of receiving water for germinating.

In yet another embodiment, a delay-able seed activation method is provided. The method includes applying a coating material to an outer surface of a seed, the coating material being adapted to prevent germination of the seed. The method further includes planting the seed in a soil, and following a delay, transmitting an electromagnetic energy through the soil such that the electromagnetic energy compromises the coating material thereby allowing germination of the seed to occur.

BRIEF DESCRIPTION OF THE DRAWING FIGURES

Illustrative embodiments of the present disclosure are described in detail below with reference to the attached drawing figures, which are incorporated by reference herein and wherein.

DETAILED DESCRIPTION

The disclosed embodiments include the coating and/or covering of seeds using a coating material, for example silica (glass), polymers, or any other material that may be disrupted, dissolved, fractured, or in some other way compromised by electromagnetic energy. The coating material forms an outer shell that prevents water from reaching the seed thereby preventing germination. To activate the seed, electromagnetic energy—which might be in the form of ultrasonic sound waves, microwaves, or other forms—is transmitted through soil to a sufficient depth to compromise the outer coating. Once the outer shell has been compromised, e.g., shattered, the seed will receive water and other nutrients and begin to grow. Because the growth is able to be originated at a particular time upon activation, a grower is able to pick a window from start to harvest that is optimal.

Seeds may be planted with planting machinery, e.g., planters or grain drills, at time when the operation may be done when other operations would provide adequate machine capacity to do the planting. Possibly the fall, winter, and spring may be suitable planting time frames. Additionally, the seed coating (formed of silica, glass, or other material) enables the seed to remain in the soil for one, or even multiple cropping seasons without being activated if desired.

Figure 1:
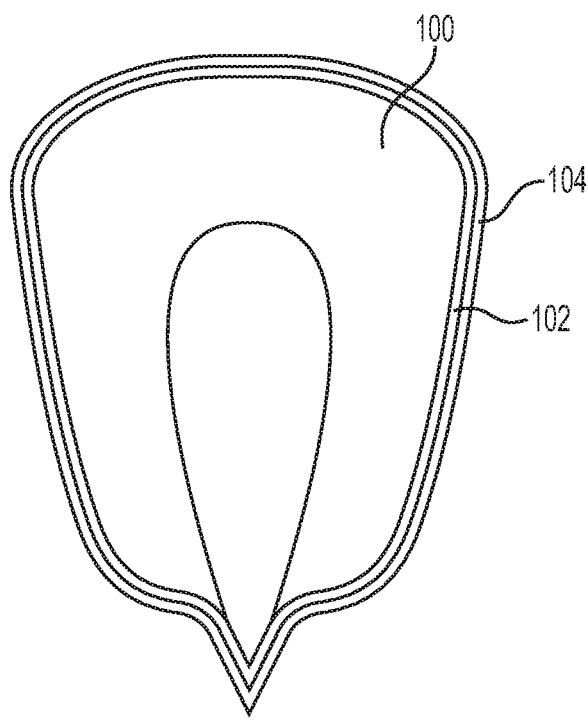
FIG. 1 shows a cross-sectional view of a seed treated according to one embodiment disclosed.

FIG. 1 shows a cross-sectional view of a corn seed which has been pretreated with a seed activation system according to a seed activation method in one embodiment. Referring to the FIG. 1, a seed 100 is initially treated with a prime layer 102 in a manner which will be known to those skilled in the art. Prime layer 102 may include insecticides, treatments, or other substances useful in germinating and otherwise promoting growth of the seed into the plant. Prime layer is also optional and is not necessary in terms of meeting the broad objectives of the present disclosures.

After prime layer 102 has been applied, a shattering layer 104 is applied. The shattering layer may be a coating of any material adapted to prevent germination of the seed in a first state and to enable or promote germination in a second state. Specifically, in the first state, the shattering layer is intact (e.g., the layer is solid and water tight), and in the second state, the shattering layer has been compromised (e.g., the layer is water permeable). In other words, in the second state, the shattering layer has been substantially, cracked, broken, dissolved, or otherwise degraded. A coating material capable of functioning in the first state is for example a material that starts as a fluid for applying to the seed and ends up as a solid for sealing the seed. For functioning in the second state, the coating material is for example 1) a brittle layer adapted for cracking and/or shattering, or 2) a dissolvable layer capable of returning to a fluid upon introduction of a particular chemical that causes a chemical reaction that dissolves the solid layer.

In certain embodiments, the shattering layer 104 comprises silica, and application of shattering layer 104 may be performed using any of a number of methods for deposing glass. For example, a spray-on liquid glass technique may be used to create the layer. When this process is used, a $SiO^2$ layering may be made of substantially pure silica (substantially pure glass). The silica coating creates a very thin, water-resistant coating. For example, the thickness may be less than about one-hundred nanometers thick. In certain embodiments, the thickness is about fifty nanometers thick. In some embodiments, the thickness is about two-hundred nanometers thick.

In some embodiments, more traditional ways of depositing the shattering layer 104 may be used. For example, seeds may be put into a mixer along with small glass beads, and the temperature is elevated to a level which does not hurt germination later on, but is sufficient to melt at least some of the glass from the glass beads to form the shattering layer. In some embodiments, an additive may be included in the glass layer that assists in activation. For example, where microwaves are used as the activation means (as described in more detail below), the silica coating may be constructed to include signal activated additive, e.g., a metal, which will initiate the shattering of the layer. The additive may be included along with the glass beads during the coating process or deposited in other ways.

Figure 2:
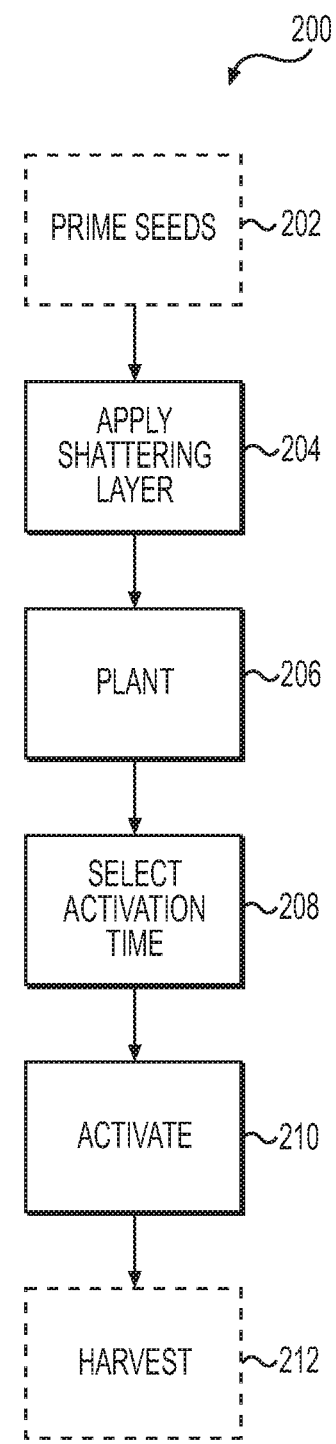
FIG. 2 shows a process flow diagram for one embodiment of a seed activation method.

FIG. 2 shows a process flow diagram for an exemplary seed activation method 200.

In an optional step 202, a prime layer is applied to the seed. In an example of step 202, prime layer 102 is applied to seed 100.

In a step 204, a shattering layer is applied. In an example of step 204, shattering layer 104 is applied to seed 100. Application of the shattering layer 104 involves applying a coating material suitable for a selected coating. For example, a glass layer may be deposed using a spray-on liquid glass technique. Alternatively, glass beads may be mixed with seeds and heating causing melted glass to adhere to an outer surface of the seeds. Upon cooling of the coated seeds, the shattering layer 104 is formed. Since the timing for planting has now been made less critical because of delay-able activation, step 204 may be executed at a time convenient to the grower (e.g., at times equipment is in low demand).

Once the seed has been coated, in a step 206, the seed is planted using any one of a number of the conventional techniques.

Once planted, in a step 208, an activation time is selected. In an example of step 208, the grower is able to select a desired activation time in consideration of i.a. (i) weather patterns or predictions; (ii) equipment availability estimates or scheduling; (iii) projected prices for the end product; and/or (iv) a desired yield.

Once the selected date arrives for activation, the grower, in a step 210, activation occurs. In an example of step 210, seed 100 is activated (germinated) for growth by exposing the seeds to an appropriate amount and type of electromagnetic energy. For example, the electromagnetic energy may be in the form of microwaves or ultrasonic waves. In certain embodiments, microwaves are transmitted using some form of microwave source. In some embodiments, ultrasonic energy is transmitted via an ultrasonic transducer.

Next, in an optional step 212, the crop is subsequently harvested following a delay to at a later time after a desired growth has occurred. Advantageously, the timing for the start of germination may be selected independent of when the seeds are planted, and a projected harvest time may also be planned in an opportune manner.

Figure 3:
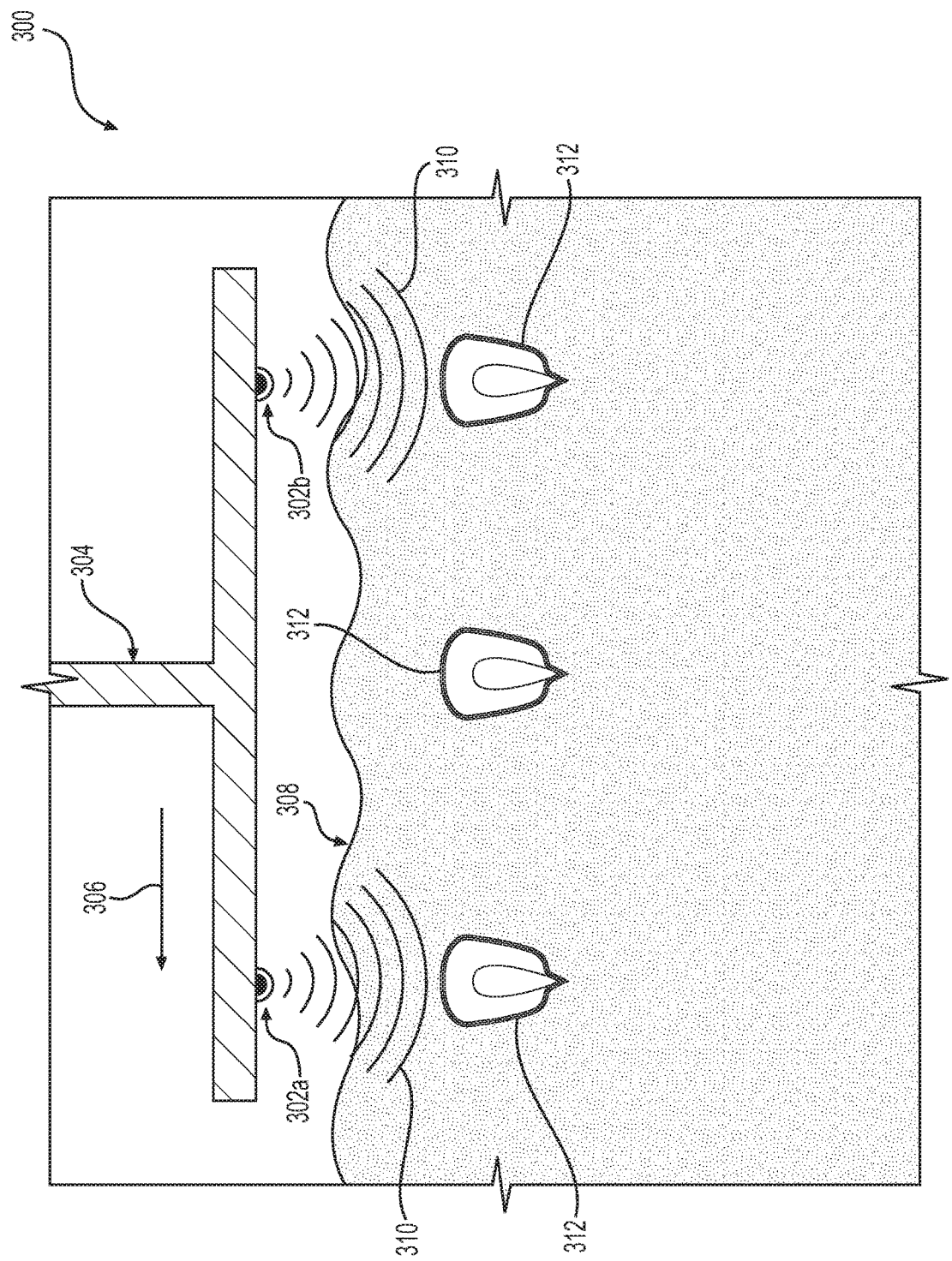
FIG. 3 shows a cross-sectional view of a ground section in which seeds treated according to the process disclosed in the embodiments of FIGS. 1 and 2 have already been planted.

FIG. 3 shows one arrangement of a seed activation system 300 for use in the execution of step 210, FIG. 2 for activation. As depicted in FIG. 3, an activation mechanism includes a forward transmitter 302a and a rear transmitter 302b located on a farm implement 304 (e.g., a trailer towed behind a tractor or placed on top of a field spraying apparatus). Those skilled in the art will recognize that some field sprayers are configured with dramatically spread out nozzles with support arms. A like device having transmitters instead of sprayers may be employed. Alternatively, transmitters could be appended to an already-existing sprayer device. Although trailers and sprayer-type devices are disclosed herein, numerous other kinds of mobile supporting devices could be used to support transmitters (e.g., transmitters 302a and 302b). Further, one or more drones equipped with transmitters could be used to support the transmitters.

It should be understood that even though FIG. 3 shows the arrangement in cross section, embodiments will likely include multiple laterally extending transmitters (going in and out of the page in FIG. 3) to increase the number of rows to be simultaneously activated. Alternatively, smaller, or even hand-held transmitter arrangements may be used. FIG. 3 also shows the farm implement 304 being in a direction of motion 306 above a body of soil 308, and the electromagnetic energy 310 reaches a plurality of pretreated seeds 312, thus rupturing the shattering layer 104 on each.

In other embodiments, activation means other than electromagnetic energy could be used. For example, a coating might be selected that could be compromised by the introduction of a particular chemical (e.g., a fertilizer or some kind of activation fluid such as a chemical that dissolves the coating).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described

The invention claimed is:

1. A seed activation system, comprising:
a substantially solid, water tight, and brittle silica-comprised shattering layer applied to an outer surface of a seed, wherein the shattering layer forms a water tight coating around the seed that prevents the seed from germinating;
signal activated additive included in the shattering layer; and
an activation mechanism for transmitting electromagnetic energy, the activation mechanism configured to compromise the shattering layer thereby breaking the water tight coating while only effecting the shattering layer such that the seed is able to receive water and germinate after electromagnetic energy is transmitted.

2. The seed activation system of claim 1, further comprising a prime layer applied to an outer surface of the seed underneath the shattering layer.

3. The seed activation system of claim 1, wherein the substantially solid, water tight, and brittle shattering layer is between about fifty nanometers thick to about two-hundred nanometers thick.

4. A seed activation method, comprising:
applying a substantially solid glass shattering layer to an outer surface of a seed, wherein the shattering layer forms a water-barrier coating around the seed thereby preventing the seed from germinating while the coating remains intact;

planting the seed in a soil;

selecting an activation time; and activating the seed at the activation time by transmitting electromagnetic energy into the soil such that compromising the shattering layer consists of breaking the water-barrier coating by effecting only the shattering layer such that the seed is capable of receiving water for germinating.

5. The seed activation method of claim 4, wherein depositing a layer of glass comprises spraying the seed with a spray-on liquid glass technique.

6. The seed activation method of claim 4, wherein applying the shattering layer comprises mixing seeds with glass beads and applying heat to at least partially melt the glass beads such that the outer surface of the seeds are coated with glass.

7. The seed activation method of claim 4, wherein transmitting electromagnetic energy comprises transmitting microwaves from a microwave source.

8. The seed activation method of claim 4, wherein transmitting electromagnetic energy comprises transmitting ultrasound from an ultrasonic transducer.

9. The seed activation method of claim 4, wherein applying the shattering layer comprises applying the water-barrier coating with an additive, the additive adapted to initiate shattering of the shattering layer upon receiving electromagnetic energy.

10. A delay-able seed activation method, comprising:

applying a solid, brittle, water impermeable glass coating material to an outer surface of a seed at a thickness of about fifty nanometers thick to about two-hundred nanometers thick, the coating material adapted to prevent germination of the seed;

planting the seed in a soil; and following a delay, transmitting an electromagnetic energy through the soil such that the electromagnetic energy activates an additive to the glass coating material and thus compromises the glass coating material while effecting only the glass coating material thereby allowing germination of the seed to occur.

11. The delay-able seed activation method of claim 10, further comprising selecting an activation time for transmitting the electromagnetic energy following the delay.

12. The delay-able seed activation method of claim 10, wherein the additive for enhancing cracking upon receiving the electromagnetic energy is a metal.

13. The delay-able seed activation method of claim 10, further comprising transmitting the electromagnetic energy from a plurality of transmitters coupled to a trailer towed behind a tractor.

14. The delay-able seed activation method of claim 10, further comprising transmitting the electromagnetic energy from a plurality of transmitters coupled to a field sprayer.

* * * * *